United States Patent
Chou

(10) Patent No.: US 12,088,084 B2
(45) Date of Patent: Sep. 10, 2024

(54) OVER-VOLTAGE PROTECTION DEVICE, MEMORY STORAGE DEVICE AND OVER-VOLTAGE PROTECTION METHOD

(71) Applicant: PHISON ELECTRONICS CORP., Miaoli (TW)

(72) Inventor: Shu-Han Chou, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 281 days.

(21) Appl. No.: 17/707,984

(22) Filed: Mar. 30, 2022

(65) Prior Publication Data
US 2023/0283065 A1 Sep. 7, 2023

(30) Foreign Application Priority Data
Mar. 7, 2022 (TW) ................................. 111108263

(51) Int. Cl.
*H02H 3/20* (2006.01)
*H02H 1/00* (2006.01)

(52) U.S. Cl.
CPC ............ *H02H 3/20* (2013.01); *H02H 1/0007* (2013.01)

(58) Field of Classification Search
CPC ............................... H02H 3/20; H02H 1/0007
USPC ........................................................ 361/91.1
See application file for complete search history.

(56) References Cited

U.S. PATENT DOCUMENTS

| | | | | |
|---|---|---|---|---|
| 7,996,162 B1* | 8/2011 | Zhang | ................ | G01R 31/2853 |
| | | | | 326/38 |
| 2015/0180220 A1* | 6/2015 | Breuer | ............... | G01R 31/2853 |
| | | | | 307/35 |
| 2017/0005466 A1* | 1/2017 | Nakano | .................. | H02H 9/045 |
| 2020/0025834 A1* | 1/2020 | Okamoto | ................. | G06F 1/30 |

FOREIGN PATENT DOCUMENTS

| | | | |
|---|---|---|---|
| CN | 203387163 | | 1/2014 |
| CN | 203387163 U | * | 1/2014 |
| CN | 204118706 | | 1/2015 |
| CN | 110362182 | | 10/2019 |
| TW | 202006718 | | 2/2020 |

OTHER PUBLICATIONS

Machine translation of Chen et al. Chinese Patent Document CN 203387163 U Jan. 2014 (Year: 2014).*
"Office Action of China Counterpart Application", issued on Aug. 10, 2023, p. 1-p. 9.
"Office Action of Taiwan Counterpart Application", issued on Sep. 8, 2022, p. 1-p. 8.

* cited by examiner

*Primary Examiner* — Kevin J Comber
(74) *Attorney, Agent, or Firm* — JCIPRNET

(57) ABSTRACT

An over-voltage protection device, a memory storage device, and an over-voltage protection method are provided. The over-voltage protection device includes a main load switch, multiple power channels, a voltage detection circuit, and a control circuit. The main load switch is configured to receive power and provide the power to a first power channel among the power channels. The voltage detection circuit is configured to detect a power abnormal status of a second power channel among the power channels. The control circuit is configured to control the main load switch to stop power supply to the first power channel according to the power abnormal status.

30 Claims, 4 Drawing Sheets

OVER-VOLTAGE PROTECTION DEVICE, MEMORY STORAGE DEVICE AND OVER-VOLTAGE PROTECTION METHOD

CROSS-REFERENCE TO RELATED APPLICATION

This application claims the priority benefit of Taiwan application serial no. 111108263, filed on Mar. 7, 2022. The entirety of the above-mentioned patent application is hereby incorporated by reference herein and made a part of this specification.

BACKGROUND

Technical Field

The disclosure relates to an over-voltage protection technology, and more particularly to an over-voltage protection device, a memory storage device, and an over-voltage protection method.

Description of Related Art

In recent years, as the demand for portable electronic devices such as mobile phones and notebook computers has grown rapidly, a considerable increase in consumer demand for storage media is seen as well. Since a rewritable non-volatile memory module (e.g., a flash memory) has the characteristics of data non-volatility, power saving, small size, and having no mechanical structure, it is very suitable for being built in a variety of portable electronic devices as exemplified above.

As the size of a memory storage device continues to shrink, the distances between the pins or solder joints in the circuit board of the memory storage device become closer as well. In practice, solder ball adhesion often occurs between adjacent pins or solder joints, thereby forming a short circuit. After the memory storage device is turned on or powered on, the short circuit may cause a circuit element (e.g., a control chip) coupled to the circuit board to be subject to high voltage on the circuit board at an incorrect time and be burnt out.

SUMMARY

The disclosure provides an over-voltage protection device, a memory storage device, and an over-voltage protection method that may provide over-voltage protection at a circuit board level.

The exemplary embodiments of the disclosure provide an over-voltage protection device, including a main load switch, multiple power channels, a voltage detection circuit, and a control circuit. The power channels are coupled to the main load switch. The voltage detection circuit is coupled to the power channels. The control circuit is coupled to the main load switch and the voltage detection circuit. The main load switch is configured to receive power and provide the power to a first power channel among the power channels. The voltage detection circuit is configured to detect a power abnormal status of a second power channel among the power channels. The control circuit is configured to control the main load switch to stop power supply to the first power channel according to the power abnormal status.

The exemplary embodiments of the disclosure further provide a memory storage device, including a circuit board, a connection interface unit, a rewritable non-volatile memory module, a memory control circuit unit, and an over-voltage protection device. The connection interface unit is configured to be coupled to a host system. The connection interface unit, the rewritable non-volatile memory module, the memory control circuit unit, and the over-voltage protection device are coupled to the circuit board. The over-voltage protection device includes a main load switch, multiple power channels, a voltage detection circuit, and a control circuit. The power channels are disposed on the circuit board and coupled to the main load switch. The voltage detection circuit is coupled to the power channels. The control circuit is coupled to the main load switch and the voltage detection circuit. The main load switch is configured to receive power from the host system and provide the power to a first power channel among the power channels. The voltage detection circuit is configured to detect a power abnormal status of a second power channel among the power channels. The control circuit is configured to control the main load switch to stop power supply to the first power channel according to the power abnormal status.

The exemplary embodiments of the disclosure further provide an over-voltage protection method for a memory storage device. The over-voltage protection method includes the following steps. A main load switch receives power from a host system and provides the power to a first power channel among multiple power channels. A power abnormal status of a second power channel among the power channels is detected. The main load switch is controlled to stop power supply to the first power channel according to the power abnormal status.

Based on the above, after the main load switch receives power and provides the power to the first power channel, the voltage detection circuit may detect the power abnormal status of the second power channel. According to the power abnormal status, the control circuit may control the main load switch to stop power supply to the first power channel. With the over-voltage protection at the circuit board level provided by the main load switch, the overall over-voltage protection efficiency of a device may be enhanced.

DESCRIPTION OF THE EMBODIMENTS

Multiple exemplary embodiments are described below to illustrate the disclosure, but the disclosure is not limited by the provided exemplary embodiments. In addition, appropriate combinations are also allowed between the exemplary embodiments. Throughout the text of the specification (including the claims), the term "couple" refers to any direct or indirect connection means. For example, where a first device is described to be coupled to a second device in the text, it should be interpreted that the first device may be directly connected to the second device, or that the first device may be indirectly connected to the second device through another device or some connection means. Furthermore, the term "signal" refers to at least current, voltage, charge, temperature, data, or any other one or more signals.

Figure 1:
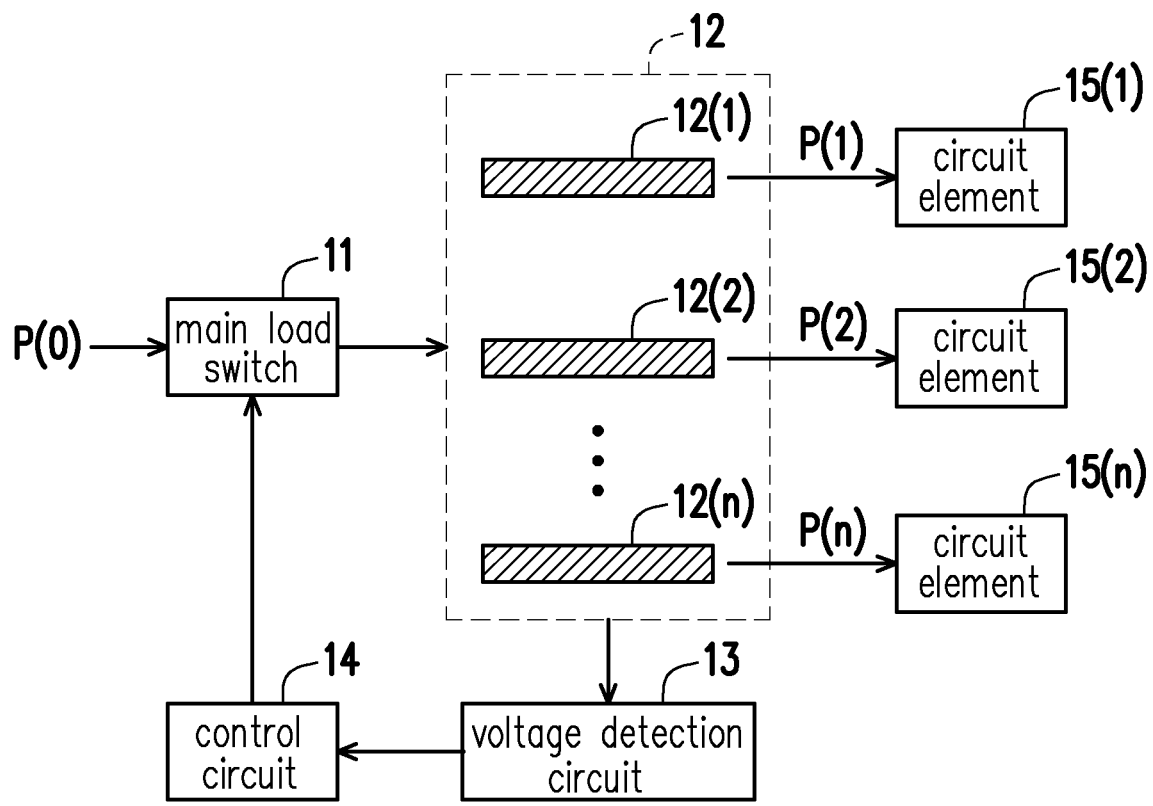
FIG. 1 is a schematic diagram of an over-voltage protection device according to the exemplary embodiments of the disclosure.

FIG. 1 is a schematic diagram of an over-voltage protection device according to the exemplary embodiments of the disclosure. With reference to FIG. 1, an over-voltage protection device 10 includes a load switch (also referred to as a main load switch) 11, power channels 12(1) to 12(n), a voltage detection circuit 13, and a control circuit 14. The power channels 12(1) to 12(n) are coupled to the main load switch 11 and the voltage detection circuit 13. The control circuit 14 is coupled to the voltage detection circuit 13 and the main load switch 11.

It should be noted that the power channels 12(1) to 12(n) are disposed on a circuit board 12. For example, the power channels 12(1) to 12(n) may be configured to respectively provide power P(1) to P(n) to circuit elements 15(1) to 15(n) coupled to the power channels 12(1) to 12(n). In other words, the power channels 12(1) to 12(n) may respectively supply power to the circuit elements 15(1) to 15(n) independently. The circuit elements 15(1) to 15(n) may respectively include, without limitation, a variety of electronic elements, circuit modules, or chips in an electronic device.

The main load switch 11 may receive power P(0). For example, the power P(0) may be the power provided or received by an electronic device including the over-voltage protection device 10. For example, assuming that the over-voltage protection device 10 is installed in a memory storage device, the power P(0) may be provided by a host system coupled to the memory storage device. Alternatively, if the electronic device has its own power supply circuit, the power P(0) may also be provided by the electronic device itself. It should be noted that the over-voltage protection device 10 may also be installed in other types of electronic devices, which is not limited by the disclosure.

After the electronic device including the over-voltage protection device 10 is powered on (e.g., being turned on), the main load switch 11 may provide the power P(0) to the power channel (also referred to as a first power channel) 12(1) among the power channels 12(1) to 12(n). After providing the power P(0) to the power channel 12(1), the voltage detection circuit 13 may detect an abnormal status (also referred to as a power abnormal status) of the power channel (also referred to as a second power channel) 12(2) among the power channels 12(1) to 12(n). It should be noted that the power channel 12(1) is different from the power channel 12(2). For example, the power channels 12(1) and 12(2) may be independent from each other on the circuit board 12. For example, the power channel 12(1) may be configured to power the circuit element 15(1), and the power channel 12(2) may be configured to power the circuit element 15(2). Next, the control circuit 13 may control the main load switch 11 to stop power supply to the power channel 12(1) according to the power abnormal status.

In an exemplary embodiment, the power abnormal status is caused by an electrical short circuit between the power channels 12(1) and 12(2). For example, a voltage predetermined to only appear in the power channel 12(1) at a certain time point may be synchronously short-circuited to the power channel 12(2) by the electrical short circuit. In an exemplary embodiment, if the power channel 12(1) continues to be powered even when the power abnormal status exists, after a while, the power channel 12(2) having a voltage at an incorrect time point and/or with an incorrect voltage value may cause the circuit element 15(2) to be damaged or even burnt out.

In an exemplary embodiment, in response to the power abnormal status, the control circuit 13 may control the main load switch 11 to stop power supply to the power channel 12(1). After power supply to the power channel 12(1) is stopped, the power abnormal status caused by the electrical short circuit in the power channel 12(2) may be removed or mitigated. In this way, the probability of the circuit element 15(2) being damaged or even burnt out can be reduced.

In an exemplary embodiment, after the electronic device including the over-voltage protection device 10 is powered on (e.g., being turned on), the voltage detection circuit 13 may detect a voltage status of each of the power channels 12(1) to 12(n). When an abnormal voltage status of a certain power channel (e.g., the power channel 12(2)) is detected, the voltage detection circuit 13 may send a warning signal to the control circuit 13 in response to the power abnormal status. In response to the warning signal, the control circuit 13 may control the main load switch 11 to stop power supply to the power channel 12(1).

In an exemplary embodiment, the voltage detection circuit 13 may continuously detect whether the voltage on each of the power channels 12(1) to 12(n) rises to a threshold (also referred to as a voltage threshold) within a non-predetermined time range. In response to the voltage of a certain power channel (e.g., the power channel 12(2)) rising to a value equal to or higher than the voltage threshold within a non-predetermined time range, the voltage detection circuit 13 may determine that the power abnormal status of the power channel (e.g., the power channel 12(2)) is detected.

In an exemplary embodiment, the power channel 12(1) is coupled to one power pin of the circuit board 12. The power channel 12(1) may introduce the power P(0) into the circuit board 12 through the power pin. Afterwards, the power P(0) introduced into the circuit board 12 may respectively power the circuit elements 15(1) to 15(n) through the power channels 12(1) to 12(n).

In an exemplary embodiment, the control circuit 14 controls the main load switch 11 to stop power supply to the power channel 12(1), which is an operation that includes or is equivalent to controlling the main load switch 11 to stop introducing the power P(0) into the entire circuit board 12. In addition, once the introduction of the power P(0) into the entire circuit board 12 is stopped, power supply to all of the power channels 12(1) to 12(n) and the circuit elements 15(1) to 15(n) is stopped as well. In this way, the probability of any one of the circuit elements 15(1) to 15(n) being damaged due to the abnormal coupling relationship (e.g., a short circuit) between specific power channels on the circuit board 12 can be effectively reduced.

Figure 2:
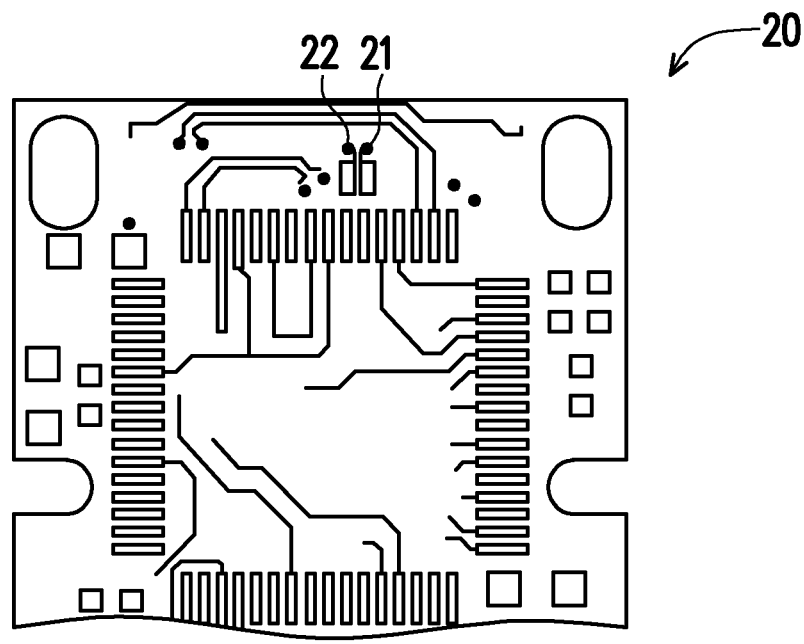
FIG. 2 is a schematic diagram of an appearance of a circuit board according to the disclosure.

FIG. 2 is a schematic view of the appearance of the circuit board according to the disclosure. With reference to FIG. 1 and FIG. 2, a circuit board 20 may include the circuit board 12 of FIG. 1. Pins 21 and 22 on the circuit board 20 may be respectively coupled to the power channels 12(1) and 12(2). Normally, the pins 21 and 22 on the circuit board 20 are not electrically conductive to each other.

In an exemplary embodiment, the pins 21 and 22 are electrically conductive to each other due to factors such as solder ball adhesion on the circuit board 20, which leads to an electrical short circuit between the power channels 12(1) and 12(2). After the power P(0) is provided to the power channel 12(1) through the pin 21, the electrical short circuit, through the pin 22, makes the voltage on the power channel 12(2) rise to the voltage threshold within a non-predetermined time range. At this time, the voltage detection circuit 13 detects the power abnormal status of the power channel 12(2). In response to the power abnormal status, the control circuit 13 may control the main load switch 11 to stop power supply to the power channel 12(1) and even stop introducing the power P(0) into the entire circuit board 20. In this way, the probability of the circuit element 15(2) coupled to the pin 22 being damaged or even burnt out can be reduced.

In an exemplary embodiment, after power supply to the power channel 12(1) (or the circuit board 20) is stopped, an inspector may use a specific instrument to check whether there is any substantive defect such as solder ball adhesion on the circuit board 20 that may cause the aforementioned power abnormal status and then solve the defect. It should be noted that the shape and the wiring method of the circuit board shown in FIG. 2 are only examples and are not intended to limit the disclosure.

Figure 3:
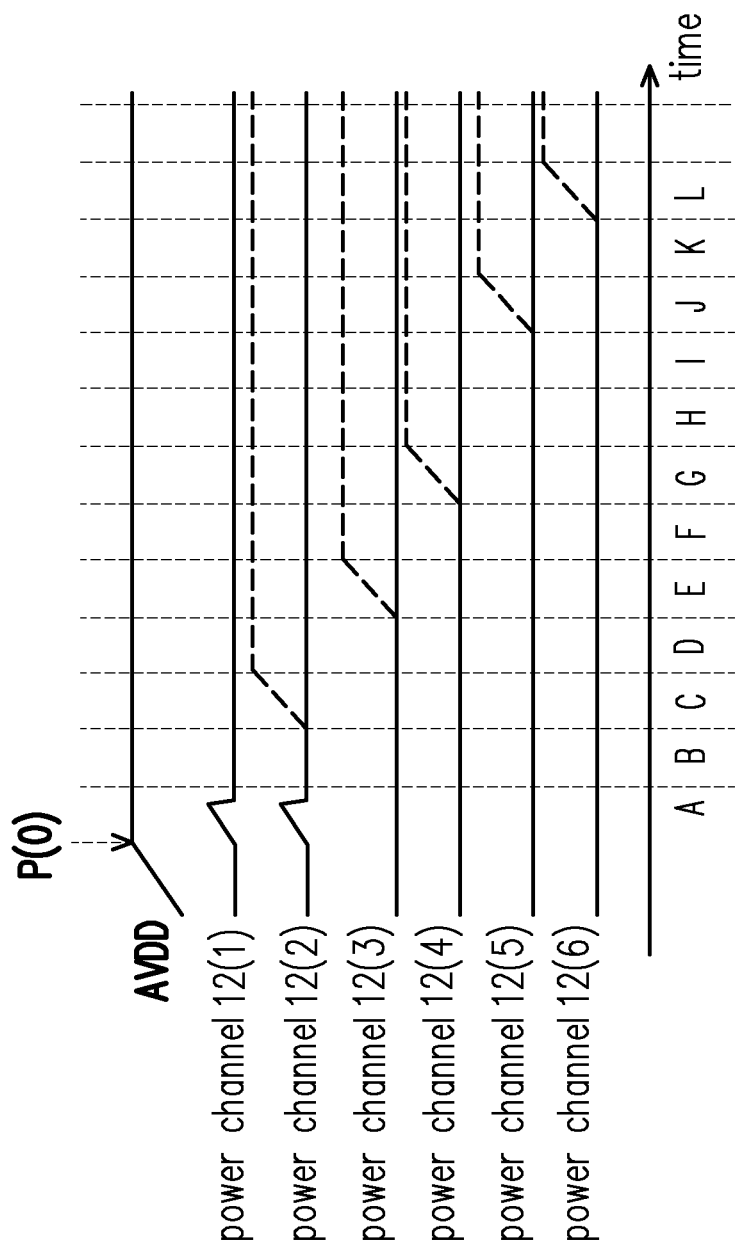
FIG. 3 is a schematic diagram of a voltage status of each power channel at different time points according to the exemplary embodiments of the disclosure.

FIG. 3 is a schematic diagram of a voltage status of each power channel at different time points according to the exemplary embodiments of the disclosure. With reference to FIGS. 1 and FIG. 3, it is assumed that the power channels 12(1) to 12(n) include power channels 12(1) to 12(6). For example, the power channels 12(1) to 12(6) may be configured to respectively supply power to the circuit elements 15(1) to 15(6) independently.

In an exemplary embodiment, after an electronic device including the over-voltage protection device 10 is powered on (e.g., being turned on), the power P(0) (i.e., AVDD) is provided to the circuit board 12 (or the power channel 12(1) through the main load switch 11. At this time, the voltage of the power channel 12(1) rises within a time range A. When there is an electrical short circuit between the power channels 12(1) and 12(2), the voltage status of the power channel 12(2) varies with the voltage status of the power channel 12(1). For example, the voltage of power channel 12(2) rises synchronously within the time range A.

On the other hand, when there is an electrical short circuit between the power channels 12(1) and 12(2), the voltage generated by the power P(0) on the power channel 12(1) has influence on the power channel 12(2), causing the voltage of the power channel 12(2) to rise to a value equal to or higher than the voltage threshold within a non-predetermined time range. At this time, the voltage detection circuit 13 detects the power abnormal status of the power channel 12(2), and the control circuit 14 controls the main load switch 11 to stop power supply to all of the power channels 12(1) to 12(6).

In an exemplary embodiment, time sequences of power supply to at least some of the power channels 12(1) to 12(6) may be different, and/or voltages of power supply to at least some of the power channels 12(1) to 12(6) may be different. For example, in a normal power supply status, the voltages of the power channels 12(1) to 12(6) respectively rise to a rated voltage corresponding to each power channel within the predetermined time ranges A, C, E, G, J, and L (or operating voltages of the circuit elements 15(1) to 15(6) coupled to the power channels 12(1) to 12(6)), as shown by voltage curves in dotted lines in FIG. 3. However, in the exemplary embodiment of FIG. 3, after power supply to all the power channels 12(1) to 12(6) is stopped until power-on or booting procedures are completed again, the voltages of the power channels 12(1) to 12(6) do not rise to avoid damage to specific circuit elements.

Figure 4:
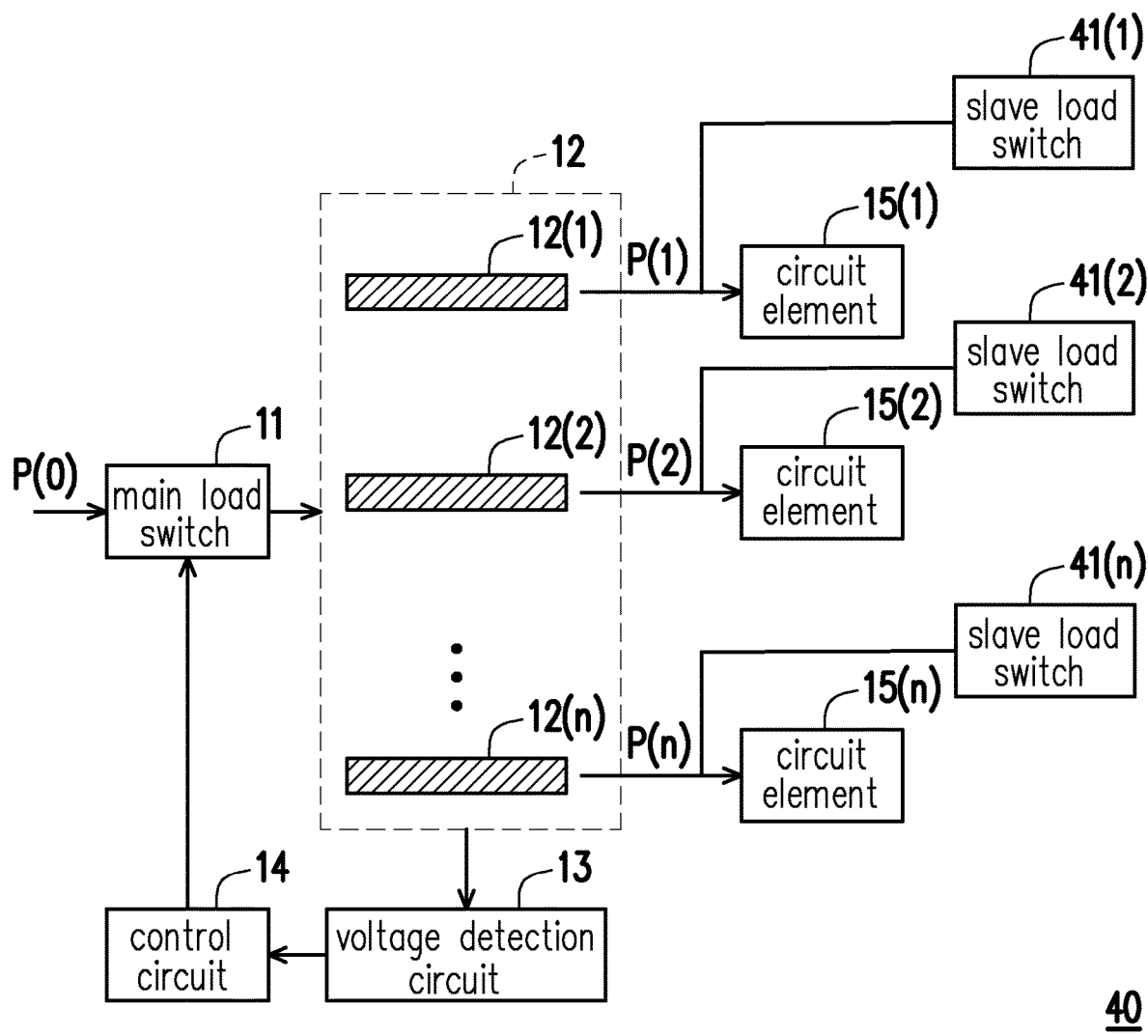
FIG. 4 is a schematic diagram of an over-voltage protection device according to the exemplary embodiments of the disclosure.

FIG. 4 is a schematic diagram of an over-voltage protection device according to an exemplary embodiment of the disclosure. With reference to FIG. 4, compared with the over-voltage protection device 10, an over-voltage protection device 40 further includes load switches (also referred to as slave load switches) 41(1) to 41(n). The slave load switches 41(1) to 41(n) are respectively coupled between the power channels 12(1) to 12(n) and the circuit elements 15(1) to 15(n). After an electronic device including the over-voltage protection device 40 completes power-on (e.g., booting) procedures, a slave load switch 41(i) may be dedicated to over-voltage protection to a circuit element 15(i). For example, when the voltage of a power channel 12(i) is higher than a predetermined value, the slave load switch 41(i) may cut off the power channel 12(i) to avoid damage to the circuit element 15(i) due to the excessively high voltage.

In an exemplary embodiment, the main load switch 11 may be regarded as a load switch at a circuit board level for controlling the power (also referred to as total power) introduced into the circuit board 12 from the front end. In addition, compared with the main load switch 11, the slave load switches 41(1) to 41(n) may be regarded as load switches at a circuit element level for respectively controlling the power provided to the circuit elements 15(1) to 15(n) from the back end.

In an exemplary embodiment, the voltage detection circuit 13 may start to detect the power abnormal status of the power channel 12(i) before the circuit element 15(i) is powered. In particular, before the circuit element 15(i) is powered, the slave load switch 41(i) may not be able to provide over-voltage protection to the circuit element 15(i) in real time because it has not been powered up.

In an exemplary embodiment, it is assumed that the power channel 12(1) is short-circuited to the input terminal of the circuit element 15(2). In this situation, once the power channel 12(1) is powered on, the power through the short circuit of the power channel 12(1) may bypass the slave load switch 41(2) and directly cause the circuit element 15(2) to be damaged (e.g., being burnt out). At this time, the slave load switch 41(2) may not even be able to provide over-voltage protection to the circuit element 15(2) in real time because it has not been powered up. In an exemplary embodiment, the main load switch 11 at the circuit board level is configured to directly detect the power abnormal status of the power channel 12(2) (e.g., a voltage abnormality on the power channel 12(2)), and the total power provided to the power channel 12(1) to 12(n) (or the circuit board 12) may be cut directly, which may thereby provide the most real-time over-voltage protection.

In an exemplary embodiment, at different time points, the voltage detection circuit 13 may determine whether a voltage abnormal occurs on the power channel 12(2) according to different voltage thresholds. For example, at a certain time point (also referred to as a first time point), the voltage detection circuit 13 may compare the voltage on the power channel 12(2) with a certain voltage threshold (also referred to as a first voltage threshold) to determine whether the voltage on the power channel 12(2) is abnormal. For example, at the first time point, in response to the voltage on the power channel 12(2) higher than the first voltage threshold, the voltage detection circuit 13 may determine that the voltage on the power channel 12(2) is abnormal (i.e., the power abnormal status of the power channel 12(2)). Afterwards, at another time point (also referred to as a second time point), the voltage detection circuit 13 may compare the voltage on the power channel 12(2) with another voltage threshold (also referred to as a second voltage threshold) to determine whether the voltage on the power channel 12(2) is abnormal. For example, at the second time point, in response to the voltage on the power channel 12(2) higher than the second voltage threshold, the voltage detection circuit 13 may determine that the voltage on the power channel 12(2) is abnormal (i.e., the power abnormal status of the power channel 12(2)). The first time point is different from the second time point. The first voltage threshold is different from the second voltage threshold.

In an exemplary embodiment, the voltage threshold of the slave load switch 41(2) performing over-voltage protection for the voltage supplied to the circuit element 15(2) may be the same or different from the voltage threshold of the voltage detection circuit 13 determining whether a voltage abnormality occurs on the power channel 12(2). For example, the voltage threshold of the slave load switch 41(2) performing over-voltage protection for the voltage supplied to the circuit element 15(2) may be 1.2 volts (meaning that the rated voltage of the circuit element 15(2) does not exceed 1.2 volts), while the voltage threshold of the voltage detection circuit 13 determining whether a voltage abnormality occurs on the power channel 12(2) may only be 0.8 volts, as long as the voltage detection circuit 13 can detect whether there is a short circuit between channels.

In an exemplary embodiment, the power channel 12(i) may be coupled to a specific voltage modulation circuit. The voltage modulation circuit may modulate the power P(0) on the circuit board 12 and transmits the modulated power to the circuit element 15(i) through the power channel 12(i). Therefore, voltages of power supply to different power channels may be the same or different to meet the specifications of circuit elements coupled at the back end.

In an exemplary embodiment, the over-voltage protection device 10 or 40 may be disposed in a memory storage device. However, in another exemplary embodiment, the over-voltage protection device 10 or 40 may also be disposed in other types of electronic devices and is not limited to being disposed in a memory storage device.

Figure 5:
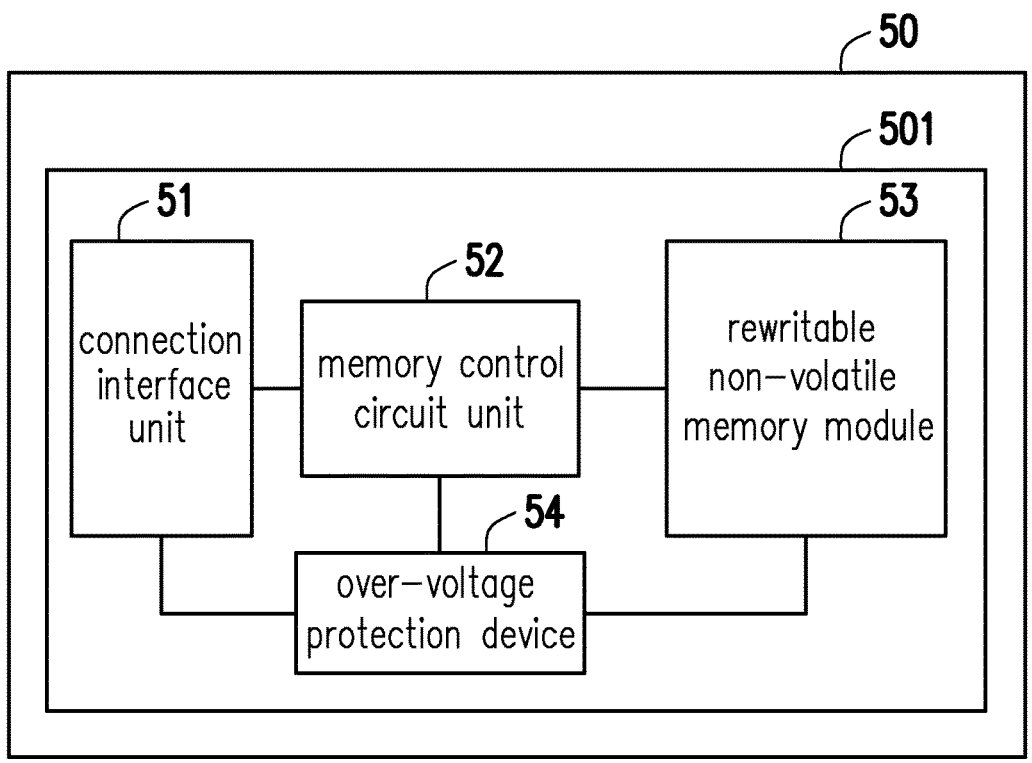
FIG. 5 is a schematic diagram of a memory storage device according to an exemplary embodiment of the disclosure.

FIG. 5 is a schematic diagram of a memory storage device according to an exemplary embodiment of the disclosure. With reference to FIG. 5, a memory storage device 50 may be used together with a host system, and the host system may write data to or read data from the memory storage device 50. For example, the host system is any system that can substantially work with the memory storage device 50 to store data, such as a desktop computer, a notebook computer, a digital camera, a video camera, a communication device, an audio player, a video player, a tablet computer, or the like.

The memory storage device 50 includes a connection interface unit 51, a memory control circuit unit 52, a rewritable non-volatile memory module 53, and an over-voltage protection device 54. The connection interface unit 51 is configured to couple the memory storage device 50 to the host system. In an exemplary embodiment, the connection interface unit 51 is compatible with the Peripheral Component Interconnect Express (PCI Express) standard. However, it should be understood that the disclosure is not limited thereto, and the connection interface unit 51 may also conform to the Serial Advanced Technology Attachment (SATA) standard, the Parallel Advanced Technology Attachment (PATA) standard, the Universal Serial Bus (USB) standard, or other suitable standards. The connection interface unit 51 may be packaged in a chip with the memory control circuit unit 52, or the connection interface unit 51 may also be disposed outside a chip including the memory control circuit unit 52.

The memory control circuit unit 52 is configured to perform operations such as data writing, reading, and erasing in the rewritable non-volatile memory module 53 according to instructions of the host system. For example, the memory control circuit unit 52 may include a memory controller.

The rewritable non-volatile memory module 53 is coupled to the memory control circuit unit 52 and is configured to store data written by the host system. The rewritable non-volatile memory module 53 may be a single-level-cell (SLC) NAND flash memory module (i.e., a flash memory module that can store 1 bit in a memory cell), a multi-level-cell (MLC) NAND flash memory module (i.e., a flash memory module that can store 2 bits in a memory cell), a triple-level-cell (TLC) NAND flash memory module (i.e., a flash memory module that can store 3 bits in a memory cell), a quad-level-cell (QLC) NAND flash memory module (i.e., a flash memory module that can store 4 bits in a memory cell), other flash memory modules, or other memory modules with the same characteristics.

Each memory cell in the rewritable non-volatile memory module 53 stores one or more bits by a change in a voltage (also referred to as a threshold voltage). For example, there is a charge trapping layer between a control gate and a channel of each memory cell. By applying a write voltage to the control gate, the number of electrons in the charge trapping layer may be changed, thereby changing the threshold voltage of the memory cell. This operation of changing the threshold voltage of the memory cell is also referred to as "writing data to the memory cell" or "programming the memory cell". As the threshold voltage changes, each memory cell in the rewritable non-volatile memory module 53 has multiple storage statuses. By applying a read voltage, it can be determined which storage status the memory cell belongs to, thereby obtaining one or more bits stored by the memory cell.

The connection interface unit 51, the memory control circuit unit 52, the rewritable non-volatile memory module 53, and the over-voltage protection device 54 may be coupled to a circuit board 501 in the memory storage device 50. For example, the connection interface unit 51, the memory control circuit unit 52, and the rewritable non-volatile memory module 53 may be included in the circuit elements 15(1) to 15(n) of FIG. 1 and be protected by the over-voltage protection device 54. With FIG. 3 as an example but without limitation, the power channel 12(2) may be coupled to the memory control circuit unit 52 (i.e., the circuit element 15(2)), the power channel 12(3) may be coupled to the connection interface unit 51 (i.e., the circuit element 15(3)), and the power channel 12(4) may be coupled to the rewritable non-volatile memory module 53 (i.e., the circuit element 15(4)).

Figure 6:
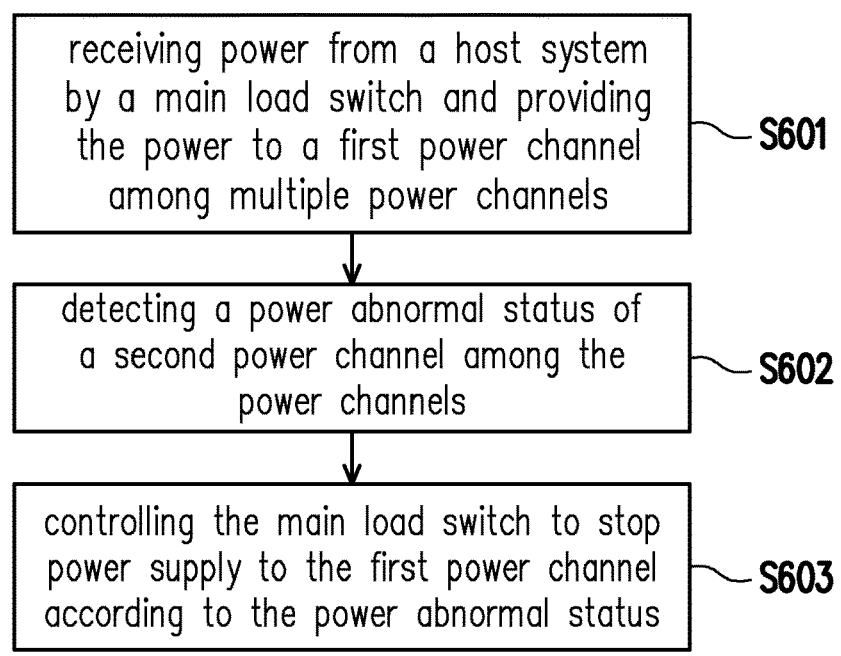
FIG. 6 is a flowchart of an over-voltage protection method according to the exemplary embodiments of the disclosure.

FIG. 6 is a flowchart of an over-voltage protection method according to an exemplary embodiment of the disclosure. With reference to FIG. 6, in step S601, a main load switch receives power from a host system and provides the power to a first power channel among multiple power channels. In step S602, a power abnormal status of a second power channel among the power channels is detected. In step S603, the main load switch is controlled to stop power supply to the first power channel according to the power abnormal status.

However, each step in FIG. 6 has been described in detail above and is not repeated herein. It should be noted that each step in FIG. 6 may be implemented by multiple program codes or circuits, and the disclosure is not limited thereto. In addition, the method in FIG. 6 may be used with the above exemplary embodiments or may be used alone, and the disclosure is not limited thereto.

In summary, the main load switch provides the over-voltage protection at the circuit board level, and the slave load switches provide the over-voltage protection at the circuit element level, thereby effectively enhancing the overall over-voltage protection efficiency of a device. In addition, the main load switch and the slave load switches at the circuit element level may operate independently without interfering with each other.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An over-voltage protection device, comprising:
   a main load switch;
   a plurality of power channels, disposed on a circuit board and coupled to the main load switch;
   a voltage detection circuit, coupled to the plurality of power channels; and
   a control circuit, coupled to the main load switch and the voltage detection circuit,
   wherein the main load switch is configured to receive power and provide the power to a first power channel among the plurality of power channels,
   the voltage detection circuit is configured to detect a power abnormal status of a second power channel among the plurality of power channels, and
   the control circuit is configured to control the main load switch to stop power supply to the first power channel according to the power abnormal status,
   a slave load switch, coupled between the second power channel and a first circuit element,
   wherein the slave load switch is dedicated to over-voltage protection to the first circuit element,
   wherein a voltage threshold of the slave load switch for the over-voltage protection to a voltage supplied to the first circuit element is higher than a voltage threshold of the voltage detection circuit detecting the power abnormal status.

2. The over-voltage protection device according to claim 1, wherein the power abnormal status is caused by an electrical short circuit between the first power channel and the second power channel.

3. The over-voltage protection device according to claim 1, wherein the power abnormal status comprises that a voltage on the second power channel rises to a voltage threshold within a non-predetermined time range.

4. The over-voltage protection device according to claim 1, wherein controlling the main load switch by the control circuit to stop power supply to the first power channel according to the power abnormal status comprises:
   controlling the main load switch to stop power supply to each of the plurality of power channels.

5. The over-voltage protection device according to claim 1, wherein the first power channel is coupled to a power pin of the circuit board for introducing the power into the circuit board.

6. The over-voltage protection device according to claim 5, wherein controlling the main load switch by the control circuit to stop power supply to the first power channel according to the power abnormal status comprises:
   controlling the main load switch to stop introducing the power into the circuit board.

7. The over-voltage protection device according to claim 1, wherein the plurality of power channels are coupled to at least one circuit element, and
   the voltage detection circuit detects the power abnormal status before the at least one circuit element is powered.

8. The over-voltage protection device according to claim 1, wherein the second power channel is coupled to a voltage modulation circuit, and
   the voltage modulation circuit is configured to modulate the power and transmit the power that is modulated to the first circuit element through the second power channel.

9. The over-voltage protection device according to claim 1, wherein detecting the power abnormal status of the second power channel among the plurality of power channels by the voltage detection circuit comprises:
   comparing a voltage on the second power channel with a first voltage threshold at a first time point; and
   comparing the voltage on the second power channel with a second voltage threshold at a second time point,
   wherein the first time point is different from the second time point, and the first voltage threshold is different from the second voltage threshold.

10. The over-voltage protection device according to claim 1, wherein a power supply time sequence of the first power channel is different from a power supply time sequence of the second power channel, and/or
    a power supply voltage of the first power channel is different from a power supply voltage of the second power channel.

11. A memory storage device, comprising:
    a circuit board;
    a connection interface unit, configured to be coupled to a host system;
    a rewritable non-volatile memory module;
    a memory control circuit unit; and
    an over-voltage protection device,
    wherein the connection interface unit, the rewritable non-volatile memory module, the memory control circuit unit, and the over-voltage protection device are coupled to the circuit board,
    and the over-voltage protection device comprises:
    a main load switch;
    a plurality of power channels, disposed on the circuit board and coupled to the main load switch;
    a voltage detection circuit, coupled to the plurality of power channels; and
    a control circuit, coupled to the main load switch and the voltage detection circuit,
    wherein the main load switch is configured to receive power from the host system and provide the power to a first power channel among the plurality of power channels,
    the voltage detection circuit is configured to detect a power abnormal status of a second power channel among the plurality of power channels, and
    the control circuit is configured to control the main load switch to stop power supply to the first power channel according to the power abnormal status,
    wherein controlling the main load switch by the control circuit to stop power supply to the first power channel according to the power abnormal status comprises:
    a slave load switch, coupled between the second power channel and a first circuit element,
    wherein the slave load switch is dedicated to over-voltage protection to the first circuit element, wherein a voltage threshold of the slave load switch for the over-voltage protection to a voltage supplied to the first circuit element is higher than a voltage threshold of the voltage detection circuit detecting the power abnormal status.

12. The memory storage device according to claim 11, wherein the power abnormal status is caused by an electrical short circuit between the first power channel and the second power channel.

13. The memory storage device according to claim 11, wherein the power abnormal status comprises that a voltage on the second power channel rises to a voltage threshold within a non-predetermined time range.

14. The memory storage device according to claim 11, wherein controlling the main load switch by the control circuit to stop power supply to the first power channel according to the power abnormal status comprises:
controlling the main load switch to stop power supply to each of the plurality of power channels.

15. The memory storage device according to claim 11, wherein the first power channel is coupled to a power pin of the circuit board for introducing the power into the circuit board.

16. The memory storage device according to claim 15, wherein controlling the main load switch by the control circuit to stop power supply to the first power channel according to the power abnormal status comprises:
controlling the main load switch to stop introducing the power into the circuit board.

17. The memory storage device according to claim 11, wherein the plurality of power channels are coupled to at least one circuit element, and
the voltage detection circuit detects the power abnormal status before the at least one circuit element is powered.

18. The memory storage device according to claim 11, wherein the second power channel is coupled to a voltage modulation circuit, and
the voltage modulation circuit is configured to modulate the power and transmit the power that is modulated to the first circuit element through the second power channel.

19. The memory storage device according to claim 11, wherein detecting the power abnormal status of the second power channel among the plurality of power channels by the voltage detection circuit comprises:
comparing a voltage on the second power channel with a first voltage threshold at a first time point; and
comparing the voltage on the second power channel with a second voltage threshold at a second time point,
wherein the first time point is different from the second time point, and the first voltage threshold is different from the second voltage threshold.

20. The memory storage device according to claim 11, wherein a power supply time sequence of the first power channel is different from a power supply time sequence of the second power channel, and/or
a power supply voltage of the first power channel is different from a power supply voltage of the second power channel.

21. An over-voltage protection method for a memory storage device, the over-voltage protection method comprising:
receiving power from a host system by a main load switch and providing the power to a first power channel among a plurality of power channels;
detecting a power abnormal status of a second power channel among the plurality of power channels; and
controlling the main load switch to stop power supply to the first power channel according to the power abnormal status,
performing over-voltage protection exclusively to a first circuit element by a slave load switch, wherein the slave load switch is coupled between the second power channel and the first circuit element,
wherein a voltage threshold of the slave load switch for the over-voltage protection to a voltage supplied to the first circuit element is higher than a voltage threshold for detecting the power abnormal status.

22. The over-voltage protection method according to claim 21, wherein the power abnormal status is caused by an electrical short circuit between the first power channel and the second power channel.

23. The over-voltage protection method according to claim 21, wherein the power abnormal status comprises that a voltage on the second power channel rises to a voltage threshold within a non-predetermined time range.

24. The over-voltage protection method according to claim 21, wherein controlling the main load switch by the control circuit to stop power supply to the first power channel according to the power abnormal status comprises:
controlling the main load switch to stop power supply to each of the plurality of power channels.

25. The over-voltage protection method according to claim 21, wherein the first power channel is coupled to a power pin of a circuit board for introducing the power into the circuit board.

26. The over-voltage protection method according to claim 25, wherein controlling the main load switch by the control circuit to stop power supply to the first power channel according to the power abnormal status comprises:
controlling the main load switch to stop introducing the power into the circuit board.

27. The over-voltage protection method according to claim 21, wherein the plurality of power channels are coupled to at least one circuit element, and the over-voltage protection method further comprises:
detecting the power abnormal status before the at least one circuit element is powered.

28. The over-voltage protection method according to claim 21, further comprising:
modulating the power by the voltage modulation circuit and transmitting the power that is modulated to the first circuit element through the second power channel.

29. The over-voltage protection method according to claim 21, wherein detecting the power abnormal status of the second power channel among the plurality of power channels comprises:
comparing a voltage on the second power channel with a first voltage threshold at a first time point; and
comparing the voltage on the second power channel with a second voltage threshold at a second time point,
wherein the first time point is different from the second time point, and the first voltage threshold is different from the second voltage threshold.

30. The over-voltage protection method according to claim 21, wherein a power supply time sequence of the first power channel is different from a power supply time sequence of the second power channel, and/or
a power supply voltage of the first power channel is different from a power supply voltage of the second power channel.

* * * * *